(12) United States Patent
Nishiyama et al.

(10) Patent No.: US 10,503,154 B2
(45) Date of Patent: Dec. 10, 2019

(54) CONTROL DEVICE HAVING FUNCTION OF COLLECTING AND SAVING TIME SERIES DATA

(71) Applicant: OMRON Corporation, Kyoto (JP)

(72) Inventors: Yoshihide Nishiyama, Yokohama (JP); Shigeyuki Eguchi, Joyo (JP); Masanori Ota, Otsu (JP)

(73) Assignee: OMRON Corporation, Kyoto (JP)

( * ) Notice: Subject to any disclaimer, the term of this patent is extended or adjusted under 35 U.S.C. 154(b) by 50 days.

(21) Appl. No.: 15/867,707

(22) Filed: Jan. 11, 2018

(65) Prior Publication Data

US 2018/0267510 A1 Sep. 20, 2018

(30) Foreign Application Priority Data

Mar. 14, 2017 (JP) ................. 2017-048273

(51) Int. Cl.
*G05B 19/418* (2006.01)
*G06F 16/2458* (2019.01)
(Continued)

(52) U.S. Cl.
CPC ....... *G05B 19/418* (2013.01); *G06F 16/2474* (2019.01); *G05B 2219/31001* (2013.01); *G06Q 10/087* (2013.01); *G06Q 50/04* (2013.01)

(58) Field of Classification Search
CPC ................ G05B 19/418; G05B 19/054; G05B 19/4183; G05B 2219/31001;
(Continued)

(56) References Cited

U.S. PATENT DOCUMENTS 6,456,894 B1 * 9/2002 Nulman ............. G03F 7/70525
700/121
6,727,106 B1 4/2004 Ankutse et al.
(Continued)

FOREIGN PATENT DOCUMENTS

EP 1058172 12/2000
JP 2004199670 7/2004
(Continued)

OTHER PUBLICATIONS

"Office Action of Europe Counterpart Application", dated Nov. 12, 2018, p. 1-p. 6.
(Continued)

*Primary Examiner* — Chun Cao
(74) *Attorney, Agent, or Firm* — JCIPRNET

(57) ABSTRACT

In a control device having functions of collecting and storing time series data, a system for facilitating posteriori analysis and interpretation is provided. The control device includes: a control operation unit acquiring input data from a control target and determines output data for the control target by executing a control operation based on the acquired input data; a manufacturing data acquisition unit acquiring manufacturing data from a manufacturing execution system associated with the control target; a time series database storing at least some of the input data, the output data, operation data calculated in the control operation according to the control operation unit, and the manufacturing data in a time series; and an outside output unit outputting a data set including observed values composed of at least some of the input data, the output data and the operation data and the manufacturing data corresponding thereto to the outside.

7 Claims, 7 Drawing Sheets

(51) Int. Cl.
*G06Q 10/08* (2012.01)
*G06Q 50/04* (2012.01)

(58) Field of Classification Search
CPC ....... G05B 2219/31372; G06F 16/2474; G06F 17/30548
See application file for complete search history.

(56) References Cited

U.S. PATENT DOCUMENTS

| | | | |
|---|---|---|---|
| 7,676,288 B2* | 3/2010 | Middleton, Jr. | .... G06F 16/2477 700/83 |
| 2012/0011141 A1* | 1/2012 | Park | .... G06F 16/3349 707/769 |
| 2016/0149407 A1* | 5/2016 | Yoo | .... H02J 3/00 700/286 |
| 2016/0371363 A1* | 12/2016 | Muro | .... G01D 9/28 |
| 2017/0316061 A1* | 11/2017 | Hubauer | .... G05B 19/054 |

FOREIGN PATENT DOCUMENTS

| | | |
|---|---|---|
| JP | 2014197346 | 10/2014 |
| JP | 2015005062 | 1/2015 |
| WO | 2016045734 | 3/2016 |

OTHER PUBLICATIONS

"Search Report of European Counterpart Application," dated Jul. 26, 2018, p. 1-p. 8.
Office Action of Europe Counterpart Application, dated Mar. 20, 2019, pp. 1-4.

* cited by examiner

CONFIGURATION OF INFORMATION OF RECORD:

| TIME | COUNTER | INDEX VALUE | MANUFACTURING DATA (EXECUTION COMMAND VALUE GROUP) | INPUT DATA (INPUT VALUE GROUP) | OPERATION DATA (OPERATION VALUE GROUP) | OUTPUT DATA (OUTPUT VALUE GROUP) |
|---|---|---|---|---|---|---|
| 601 | 602 | 603 | 604 | 605 | 606 | 607 |

FIG. 5(A)

EXAMPLE OF INFORMATION OF RECORD:

| 2016.9.20 10:50:34.250.000 | 123456789 | 567890 | PART NUMBER 001 | SENSOR 1 = 1.234 | VARIABLE X = 0.789 | MOTION TARGET VALUE Y=34.5 |
| 2016.9.20 10:50:34.250.500 | 123456889 | 567891 | PART NUMBER 001 | SENSOR 1 = 1.235 | VARIABLE X = 0.800 | MOTION TARGET VALUE Y=35.0 |

FIG. 5(B)

CONTROL DEVICE HAVING FUNCTION OF COLLECTING AND SAVING TIME SERIES DATA

CROSS-REFERENCE TO RELATED APPLICATION

This application claims the priority benefit of Japanese application serial no. 2017-048273, filed on Mar. 14, 2017. The entirety of the above-mentioned patent application is hereby incorporated by reference herein and made a part of this specification.

BACKGROUND

Technical Field

The disclosure relates to a control device having functions of collecting and saving time series data.

Description of Related Art

Factory automation (FA) technology using control devices such as a programmable Logic controller (PLC) and the like is widespread in various production fields. There is a need for posteriori analysis of data handled by such control devices.

For example, Japanese Patent Application Laid-Open (JP-A) No. 2004-199670 discloses a data collection device which can collect data from a CPU unit of a PLC correctly and rapidly. More specifically, JP-A No. 2004-199670 discloses a data collection device which is connected to a PLC bus of the PLC and collects IO data from the CPU unit. In addition, Japanese Patent Application Laid-Open (JP-A) No. 2014-197346 discloses a controller which transmits collected data to a database system.

With the progress of information and communication technology (ICT), control devices have come to be able to collect and store a large amount of data. For example, Japanese Patent Application Laid-Open (JP-A)exe No. 2015-005062 discloses a programmable logical controller in which a database is constructed using an on-memory on a nonvolatile memory which is a nonvolatile storage device having no upper limit on the number of times data is written.

In general, data collected in a database is used for posteriori analysis, interpretation and the like. Accordingly, even when a configuration in which a large amount of data is collected in a database included in a control device as described above is employed, a system for easily performing posteriori analysis, interpretation and the like is required.

To realize the aforementioned need, an object of the disclosure provides a system for easily performing posteriori analysis and interpretation in a control device having functions of collecting and saving time series data.

SUMMARY

A control device according to an aspect of the disclosure includes: a control operation unit which acquires input data from a control target and determines output data for the control target by executing a control operation based on the acquired input data; a manufacturing data acquisition unit which acquires manufacturing data from a manufacturing execution system associated with the control target; a time series database which stores at least some of the input data, the output data, operation data calculated in the control operation according to the control operation unit, and the manufacturing data in a time series; and an outside output unit which outputs a data set including observed values composed of at least some of the input data, the output data and the operation data and the manufacturing data corresponding thereto to the outside.

According to the disclosure, posteriori analysis and interpretation can be facilitated in the control device having functions of collecting and storing time series data.

BRIEF DESCRIPTION OF THE DRAWINGS

FIG. 5(A) and FIG. 5(B) are diagrams illustrating an example of a data structure of time series data output from the control device according to the present embodiment.

DESCRIPTION OF THE EMBODIMENTS

Preferably, the outside output unit outputs the data set to the manufacturing execution system, and the manufacturing execution system specifies a target product on the basis of the manufacturing data included in the data set and generates information related to quality traceability on the basis of the observed values with respect to the specified target product.

Preferably, the manufacturing data includes any one of a part number, a lot number and a formulation number of a product.

Preferably, the outside output unit outputs the data set to an external server, and the external server saves a larger amount of data sets from the outside output unit than the amount of data stored in the time series database of the control device and performs data analysis based on the saved data sets.

Preferably, corresponding data is sequentially stored in the time series database with the same period as an execution period of the control operation in the control operation unit.

Preferably, the observed values are associated with information indicating a time or timing at which the observed values are acquired in the data set.

Embodiments of the disclosure will be described in detail with reference to the drawings. Meanwhile, the same reference signs are attached to the same or corresponding parts throughout the drawings and description thereof will be not repeated.

A. Example of Overall Configuration of Control System

First, an example of the overall configuration of a control system 1 including a control device according to the present embodiment will be described.

Figure 1:
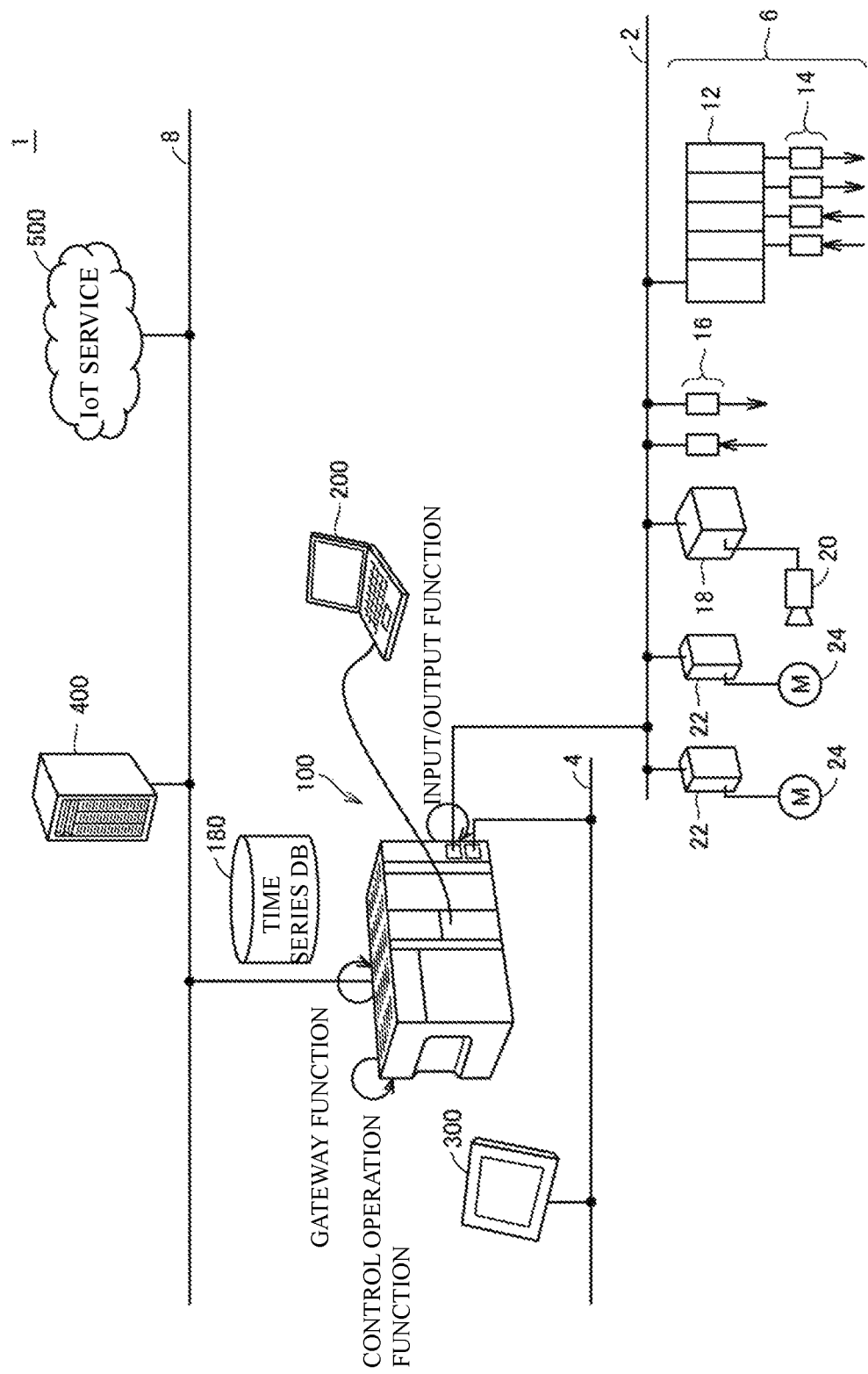
FIG. 1 is a schematic diagram illustrating an example of the overall configuration of a control system according to the present embodiment.

FIG. 1 is a schematic diagram illustrating an example of the overall configuration of the control system 1 according to the present embodiment. Referring to FIG. 1, the control system 1 according to the present embodiment includes a control device 100 which controls a control target and a support device 200 connected to the control device 100, as main components.

The control device 100 may be realized as a kind of computer such as a programmable Logic controller (PLC) or the like. The control device 100 is connected to a field device group 6 via a first field bus 2 and connected to one or more display devices 300 via a second field bus 4. The control device 100 exchanges data with devices connected thereto through each bus or a network.

The control device 100 has a control operation function of executing various operations for controlling a manufacturing apparatus or equipment. The control device 100 has an input/output function of acquiring data (hereinafter referred to as "input data") obtained by measurement by the field device group 6 and transmitted to the control device 100 and various types of data calculated according to the control operation function, and a time series database 180 in addition to the control operation function. Meanwhile, "database" is also referred to as "DB" in the following description. The time series database 180 stores various types of data acquired according to the input/output function in a time series as will be described below.

It is desirable that the first field bus 2 and the second field bus 4 employ a bus or a network used for fixed-cycle communication in which a data arrival time is guaranteed. As such buses or networks used for such fixed-cycle communication, EtherCAT (registered trademark), EtherNet/IP (registered trademark), DeviceNet (registered trademark), CompoNet (registered trademark) and the like are known.

The field device group 6 includes devices which collect input data from control targets or manufacturing apparatuses and production lines related to (hereinafter, also collectively referred to as a "field"). As such devices collecting input data, an input relay, various sensors (e.g., an analog sensor, a temperature sensor, a vibration sensor and the like) and the like may be conceived. Further, the field device group 6 includes devices which apply certain operations for fields on the basis of a command (hereinafter, also referred to as "output data") generated by the control device 100. As such devices which apply certain operations for fields, an output relay, a contactor, a servo driver, a servo motor and other actuators may be conceived.

In this manner, the control operation function of the control device 100 acquires input data from a control target and determines output data for the control target by executing a control operation based on the acquired input data.

The field device group 6 exchanges data including input data and output data with the control device 100 via the first field bus 2. In the configuration example illustrated in FIG. 1, the field device group 6 includes a remote input/output (I/O) device 12, a relay group 14, an image sensor 18 and a camera 20, servo drivers 22 and servo motors 24. The field device group 6 is not limited thereto and may employ any device which can collect input data or can perform certain actions based on output data.

The remote I/O device 12 includes a communication unit which performs communication via the first field bus 2 and an input/output unit (hereinafter, also referred to as "I/O unit") for performing acquisition of input data and output of output data. Through this I/O unit, input data and output data are exchanged between the control device 100 and a field. FIG. 1 illustrates an example in which digital signals are exchanged as input data and output data through the relay group 14.

The I/O unit may be directly connected to a field bus or a field network. FIG. 1 illustrates an example in which I/O units 16 are directly connected to the first field bus 2.

The image sensor 18 performs image measurement processing such as pattern matching and the like on image data captured by the camera 20 and outputs the processing results to the control device 100.

The servo driver 22 drives the servo motor 24 according to output data (e.g., a position command, a speed command and the like) from the control device 100.

Although data is exchanged between the control device 100 and the field device group 6 via the first field bus 2, as described above, the exchanged data is updated using extremely short periods of the order of hundreds of μsec to tens of msec. A process of updating exchanged data is referred to as "I/O refresh process" in some cases.

In addition, the display device 300 connected to the control device 100 via the second field bus 4 receives an operation from a user, outputs a command or the like according to the user operation to the control device 100 and graphically displays an operation result of the control device 100.

The support device 200 supports preparation necessary for the control device 100 to control a control target. Specifically, the support device 200 provides development environments (a program creating and editing tools, a parser, a compiler and the like) of programs executed in the control device 100, setting environments for setting parameters (configurations) of the control device 100 and various devices connected to the control device 100, a function of outputting a created user program to the control device 100, a function of correcting and modifying a user program executed in the control device 100 online, and the like.

Further, the control device 100 also has a gateway function of outputting data acquired according to the input/output function and/or data stored in the time series database 180 to an external device.

As an external device, FIG. 1 illustrates a manufacturing execution system (MES) 400 and an Internet of Things (IoT) service 500 connected to the control device 100 via a higher level network 8 as typical examples.

The manufacturing execution system 400 acquires information from a manufacturing apparatus or equipment corresponding to a control target and monitors and manages the entire production and can handle order information, quality information, shipping information and the like. A database for storing information may be provided inside of the manufacturing execution system 400 or parallel with the manufacturing execution system 400. The control device 100 can acquire manufacturing data which represents a manufacturing state in the manufacturing apparatus or equipment corresponding to the control target from the manufacturing execution system 400.

As the IoT service 500, a system which acquires information from a manufacturing apparatus or equipment corresponding to a control target and performs macro or micro analysis and the like may be conceived. For example, data mining for extracting some characteristic tendencies included in information from a manufacturing apparatus or equipment corresponding to a control target, a machine learning tool for performing machine learning based on information from facilities or a machine corresponding to a control target, and the like may be conceived.

As will be described below, the control device 100 can provide information from a manufacturing apparatus or equipment corresponding to a control target for such external systems and external services. The input/output function and the gateway function for realizing provision of such information will be described in detail.

B. Example of Hardware Configuration of Control Device

Next, an example of a hardware configuration of the control device 100 constituting the control system 1 according to the present embodiment will be described.

Figure 2:
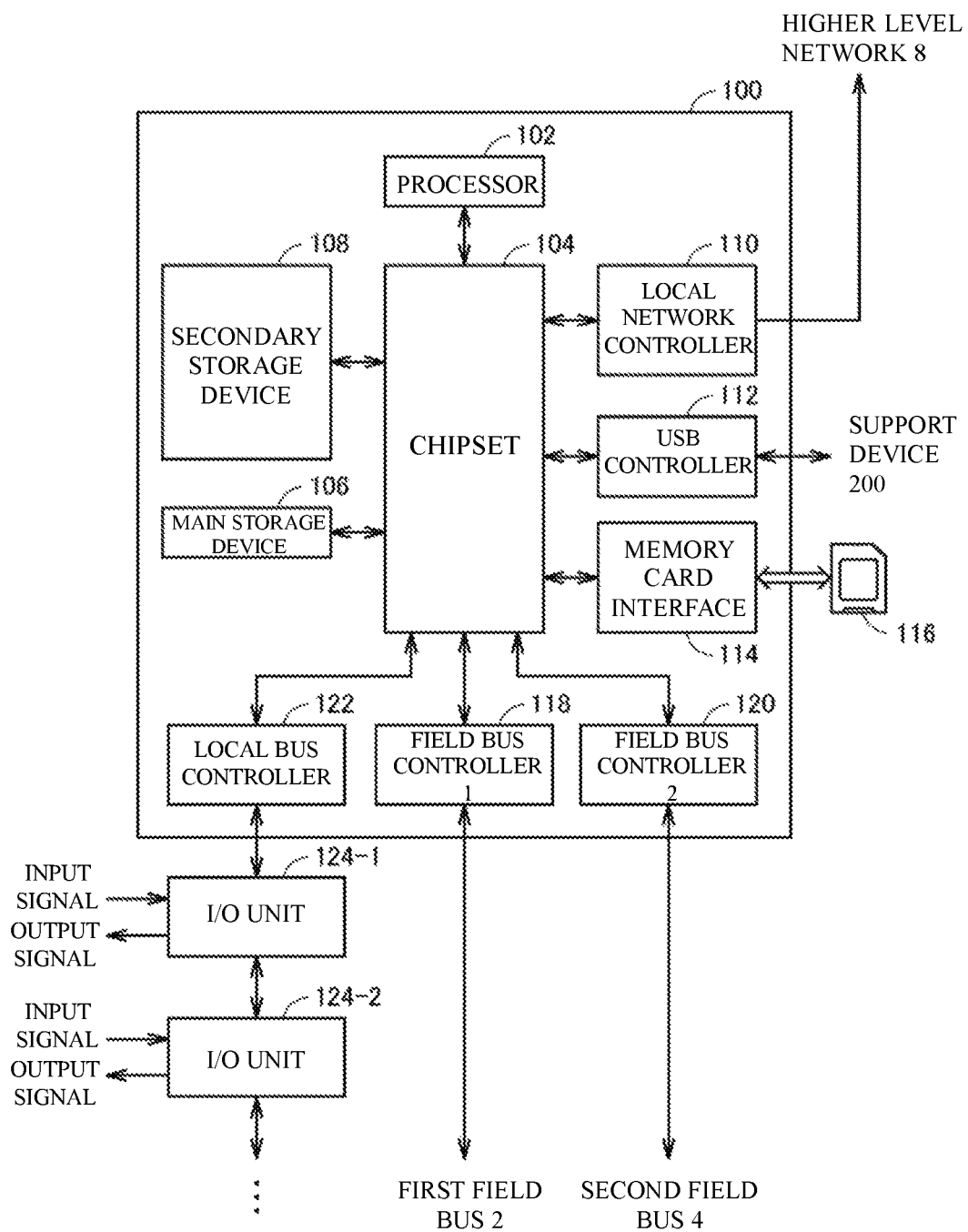
FIG. 2 is a block diagram illustrating an example of a hardware configuration of a control device constituting the control system according to the present embodiment.

FIG. 2 is a block diagram illustrating an example of a hardware configuration of the control device 100 constituting the control system 1 according to the present embodiment. Referring to FIG. 2, the control device 100 includes an operation processing unit and one or more I/O units such as I/O unit 124-1, I/O unit 124-2.

The control device 100 includes a processor 102, a chipset 104, a main storage device 106, a secondary storage device 108, a higher level network controller 110, a universal serial bus (USB) controller 12, a memory card interface 114, a local bus controller 122, and field bus controllers1 118 and field bus controllers 2 120.

The processor 102 is composed of a central processing unit (CPU), a micro-processing unit (MPU) or the like and realizes control corresponding to a control target and various processes which will be described below by reading various programs stored in the secondary storage device 108 and loading and executing the programs in the main storage device 106. The chipset 104 realizes processing for the entire control device 100 by controlling the processor 102 and each device.

The secondary storage device 108 stores a user program created depending on a manufacturing apparatus or equipment corresponding to a control target in addition to a system program for realizing basic functions. Further, the secondary storage device 108 also stores a time series database 180 which will be described below.

The higher level network controller 110 exchanges data with the manufacturing execution system 400, the IoT service 500 (refer to FIG. 1) and the like via the higher level network. The USB controller 112 controls exchange of data with the support device 200 through USB connection.

The memory card interface 114 is configured such that the memory card 116 can be attached/detached thereto/therefrom and can write data to the memory card 116 and read various types of data (user programs, trace data and the like) from the memory card 116.

The local bus controller 122 is an interface which exchanges data with the I/O units 124-1, 124-2, . . . mounted on the control device 100.

The field bus controller1 118 controls exchange of data with other devices via the first field bus 2. In the same manner, the field bus controller2 120 controls exchange of data with other devices via the second field bus 4.

Although FIG. 2 illustrates a configuration example in which the processor 102 provides necessary functions by executing programs, some or all of such provided functions may be implemented using dedicated hardware circuits (e.g., an application specific integrated circuit (ASIC), a field-programmable gate array (FPGA) and the like). Alternatively, main parts of the control device 100 may be realized using hardware (e.g., an industrial personal computer based on a general-purpose personal computer) conforming to general-purpose architecture. In this case, a plurality of operating systems (OS) having different purposes may be executed in parallel using a virtualization technology to execute applications necessary for the respective OSs.

C. Overview

Figure 3:
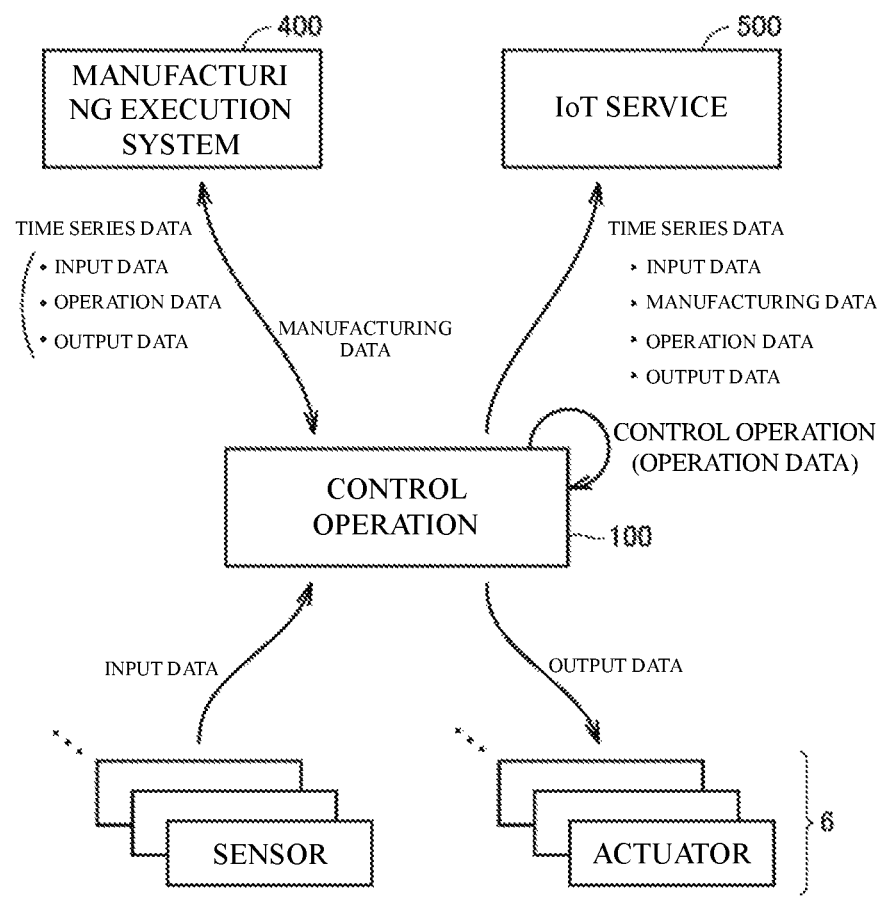
FIG. 3 is a schematic diagram for describing an overview of functions provided by a control device according to the present embodiment.

Next, an overview of functions provided by the control device 100 according to the present embodiment will be described. FIG. 3 is a schematic diagram for describing an overview of functions provided by the control device 100 according to the present embodiment.

Referring to FIG. 3, the control device 100 is connected to the field device group 6 including various sensors and actuators. That is, the control device 100 acquires input data from sensors, executes a control operation on the basis of the acquired input data and outputs output data indicating the result of the control operation to actuators.

In addition to these control operations, the control device 100 acquires data handled thereby in a time series and outputs the acquired time series data to the manufacturing execution system 4.

In the specification, "time series data" refers to a series of values obtained by continuously (or discontinuously at regular intervals) observing temporal variation in data (observed values) regarding any target. The control device 100 includes the time series database 180 which stores such time series data.

In addition, the control device 100 acquires manufacturing data managed in the manufacturing execution system 400. The control device 100 also stores the manufacturing data from the manufacturing execution system 400 as time series data of the time series database 180.

Furthermore, the control device 100 outputs time series data stored in the time series database 180 to the IoT service 500. For example, the time series data output from the control device 100 to the IoT service 500 includes all or some of input data acquired from sensors and the like, manufacturing data acquired from sensors or related apparatuses, operation data calculated through control operation and internally saved, and output data corresponding to commands to actuators and the like. The IoT service 500 can perform various interpretation, analyses and the like on the basis of the time series data from the control device 100.

D. Example of Software Configuration of Control Device

Next, an example of a software configuration of the control device 100 constituting the control system 1 according to the present embodiment will be described.

Figure 4:
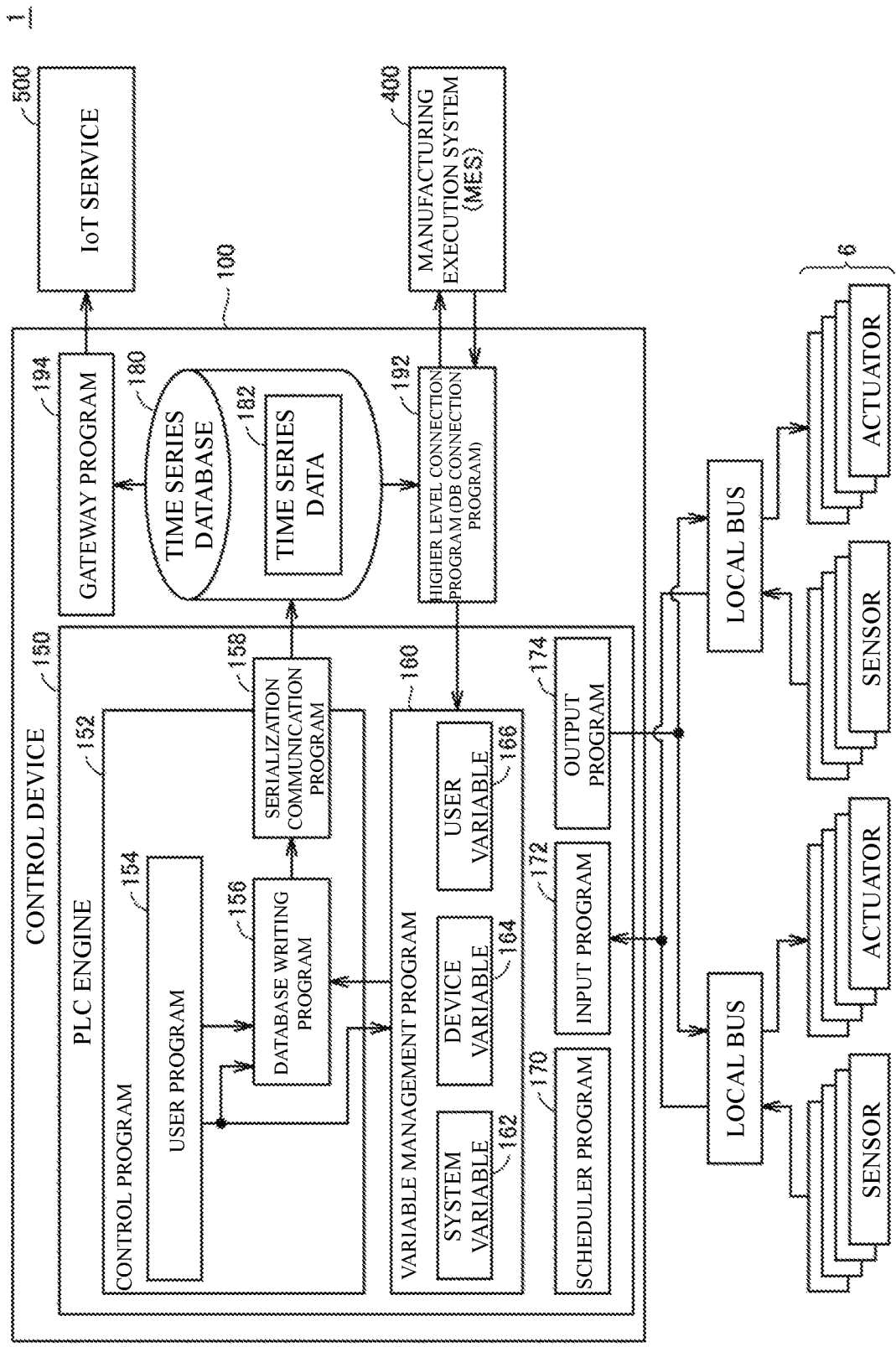
FIG. 4 is a block diagram illustrating an example of a software configuration of the control device constituting the control system according to the present embodiment.

FIG. 4 is a block diagram illustrating an example of a software configuration of the control device 100 constituting the control system 1 according to the present embodiment. Referring to FIG. 4, the control device 100 includes a PLC engine 150, the time series database 180, a higher level connection program 192, and a gateway program 194.

Typically, the PLC engine 150 can execute various programs under an execution environment for various programs, which is provided by the processor 102 of the control device 100 executing a system program. More specifically, the PLC engine 150 includes a control program 152, a variable management program 160, a scheduler program 170, an input program 172, and an output program 174. The variable management program 160, the scheduler program 170, the input program 172 and the output program 174 may be implemented as part of the system program. In this case, functions provided by such programs may be provided by a single system program.

Typically, the control program 152 is composed of a user program 154, a database writing program 156 and a serialization communication program 158. The user program 154 corresponds to a main part which provides the control operation function and can be arbitrarily configured depending on a manufacturing apparatus or equipment which is a control target of the control device 100. For example, the user program 154 can be defined using a ladder logic and the like using a function block and the like.

The database writing program 156 is called according to a command defined in the user program 154 to write designated data in the time series database 180.

The serialization communication program 158 performs serialization processing on the data written in the time series database 180 according to the database writing program 156. More specifically, the serialization communication program 158 executes a process (serialization) of converting time series data into byte strings which can be stored. Target data is converted into predetermined byte strings according to the serialization processing and then stored in the time series database 180. The serialization processing is not necessarily performed depending on a speed of writing data in the time series database 180 and a data capacity for writing therein. That is, the serialization communication program 158 is an optional component.

The variable management program 160 manages values that can be used in the PLC engine 150 in the form of variables. More specifically, the variable management program 160 manages system variables 162 indicating states and the like of the control device 100, device variables 164 indicating values saved by various devices connected to the control device 100 via a local bus or a field bus, and user variables 166 indicating values saved by the user program 154 executed in the control device 100.

The scheduler program 170 manages resource allocation, execution timing and the like with respect to processes, tasks and the like executed in the control device 100.

The input program 172 provides a function of acquiring input data from various devices connected to the control device 100 via a local bus or a field bus.

The output program 174 outputs command values (output data) calculated according to the user program 154 executed in the control device 100 to a target device connected through a local bus or a field bus.

The time series database 180 is typically placed in the main storage device 106 or the secondary storage device 108 (refer to FIG. 2) and has a function of storing data and a search function of replying to an external request (query) with designated data. The time series database 180 stores time series data 182 written according to the database writing program 156. That is, the time series database 180 stores at least part of input data, output data, operation data calculated in control operation according to the control program 152 and manufacturing data in a time series.

Meanwhile, a statistical recording program which performs statistical processing on the input data, output data, operation data, manufacturing data and the like managed by the control device 100 and then writes the data in the time series database 180 may be further provided. As the statistical processing, for example, methods such as piecewise aggregate approximation (PAA) and symbolic aggregate approximation (SAX) can be used. PAA can discover a pattern from time series data and easily performs compression according to the discovered pattern. Alternatively, SAX can achieve facilitation of compression and pattern discovery by converting time series data into character strings.

The higher level connection program 192 exchanges data with external devices connected to a higher level network such as the manufacturing execution system 400. In the control device 100 according to the present embodiment, input data and operation data can be output from the control device 100 to the manufacturing execution system 400 and simultaneously manufacturing data can be received from the manufacturing execution system 400. In this manner, the higher level connection program 192 provides a manufacturing data acquisition function of acquiring manufacturing data from the manufacturing execution system 400 associated with a control target.

When the manufacturing execution system 400 includes a database or a database is provided separately from the manufacturing execution system 400, a database connection program may be installed instead of the higher level connection program 192 or as part of the higher level connection program 192. For example, such a database connection program may be configured to execute a process of transmitting a query in such as SQL to a relational database and receiving a response.

The gateway program 194 provides time series data for the IoT service 500.

Specifically, the gateway program 194 acquires data of a designated type from the time series database 180 in a designated period and outputs the acquired data as time series data. The time series output to the IoT service 500 according to the gateway program 194 will be described in detail below.

Next, an example of processes in the example of the software configuration of the control device 100 illustrated in FIG. 4 will be described. Basically, in addition to a process related to the basic control operation of acquiring input data from the field device group 6, executing a control operation on the basis of the acquired input data and outputting output data obtained according to execution of the control operation to the field device group 6, a process of exchanging data with the manufacturing execution system 400 and the IoT service 500 is executed.

That is, the input program 172 of the control device 100 acquires input data from sensors via a local bus and/or a field bus. In addition, the higher level connection program 192 of the control device 100 acquires manufacturing data from the manufacturing execution system 400. The variable management program 160 manages the acquired input data and manufacturing data as variables. The user program 154 executes a pre-designated control operation with reference to the system variables 162, device variables 164 and user variables 166 managed by the variable management program 160 and outputs the execution result (output data) to the variable management program 160.

The output program 174 outputs the output data calculated through the control operation of the user program 154 to an actuator via a local bus and/or a field bus as control output.

The database writing program 156 writes designated observed values in variables managed by the variable management program 160 in the time series database 180.

The higher level connection program 192 outputs values of designated variables in the variables managed by the variable management program 160 and/or designated data among the time series data 182 stored in the time series database 180 to the manufacturing execution system 400 as time series data. The manufacturing execution system 400 uses the time series data from the control device 100 as manufacture result data for management such as quality traceability.

The gateway program 194 outputs values of designated variables in the variables managed by the variable management program 160 and/or designated data in the time series data 182 stored in the time series database 180 to the IoT service 500 as time series data. The IoT service 500 performs predictive maintenance and the like of facilities, an apparatus or the like corresponding to a control target by performing behavior analysis on the basis of the time series data from the control device 100.

E. Data Structure

Next, an example of a data structure of time series data output from the control device 100 to an external device such as the IoT service 500 will be described.

FIG. 5(A) and FIG. 5(B) are diagrams illustrating an example of a data structure of time series data output from the control device 100 according to the present embodiment. Referring to FIG. 5(A), a record 600 constituting time series data output from the control device 100 includes a time field 601, a counter field 602, an index field 603, a manufacturing data field 604, an input data field 605, an operation data field 606, and an output data field 607.

The time field 601 and the counter field 602 store information indicating a timing at which corresponding data (one or more observed values) is acquired. Specifically, a time indicating a timing at which corresponding data is acquired is stored in the time field 601. A count value of a counter managed by the control device 100 or a count value of a counter for managing timing in a field bus and the like when the corresponding data is acquired is stored in the counter field 602. Meanwhile, both the time field 601 and the counter field 602 are not necessarily used and any one thereof may be provided.

The index field 603 stores a value (index value) incremented/decremented by a predetermined value according to operation of writing a record in a database, and the like. Typically, a value counted up by 1 whenever a record is stored is used. When a plurality of time series databases are provided, an independent index value may be used for each database.

The manufacturing data field 604 stores one or more observed values belonging to manufacturing data. Specifically, an execution command value group (e.g., a part number, a lot number, a formulation number and the like of a workpiece) received from the manufacturing execution system 400 may be stored as manufacturing data. That is, manufacturing data includes any one of a part number, a lot number and a formulation number of a product. Further, an identification number which uniquely specifies a workpiece and information which specifies the type and the like of the workpiece may be included as the execution command value group.

The input data field 605 stores one or more observed values belonging to input data. Specifically, digital signals (state values) and analog signals (various measurement signals) acquired from various sensors may be stored as input data. The input data field 605 may store information for specifying a sensor which has output an observed value along with the observed value in addition to the observed value.

The operation data field 606 stores one or more observed values belonging to operation data. Specifically, variable values, transient values and the like calculated according to execution of the user program 154 may be stored as operation data. The operation data field 606 may store information for specifying the user program 154, a task or the like which has output an observed value along with the observed value.

The output data field 607 stores one or more observed values related to output data. Specifically, command values and the like output for a motion drive, an opening adjustor and the like may be stored. The output data field 607 may store information for specifying an actuator corresponding to an output designation of a command value along with the command value.

A record in which necessary data is stored in each field as described above is generated and output in a control period or for each predetermined event. More specifically, FIG. 5(B) shows an example in which a record is generated and output every 500 μsec, for example. In this manner, records including designated observed values are generated and output in a time series, and thus various analyses can be performed on the basis of such time series data.

As illustrated in FIG. 5(A), an observed value (at least some of values stored in the input data field 605, the operation data field 606, the output data field 607) and information indicating the time or timing at which the observed value is acquired are associated with each other in a data set (record 600).

The record 600 illustrated in FIG. 5(A) is output to the manufacturing execution system 400 and/or the IoT service 500. That is, both the higher level connection program 192 and the gateway program 194 of the control device 100 provide an outside output function of outputting a data set (record 600) including observed values composed of at least some of input data, output data and operation data and manufacturing data corresponding thereto to the outside.

Although FIG. 5(A) illustrates an example of a data structure of time series data output from the control device 100 to an external device such as the IoT service 500 as a typical example, the record 600 as shown in FIG. 5(A) may be stored in the time series database 180 of the control device 100 or a record having a data structure different from the record 600 as shown in FIG. 5(A) may be stored in the time series database 180. Records read from the time series database 180 may be output intact when the records are stored in the same data structure as the record 600 shown in FIG. 5(A) in the time series database 180 and may be processed and then output when the records are stored in a different data structure from the record 600 shown in FIG. 5(A) in the time series database 180.

At any control timing, generation of a record to be output to the outside and generation of a record to be stored in the time series database 180 may be independently performed.

A record having the same data structure as the record 600 shown in FIG. 5(A) may also be output to the manufacturing execution system 400.

In addition, the record 600 shown in FIG. 5(A) may be configured as a key-value type. In this case, the time field 601 and the counter field 602 may be set to a Key and other pieces of information may be set to Values, for example.

F. Application Example

Figure 6:
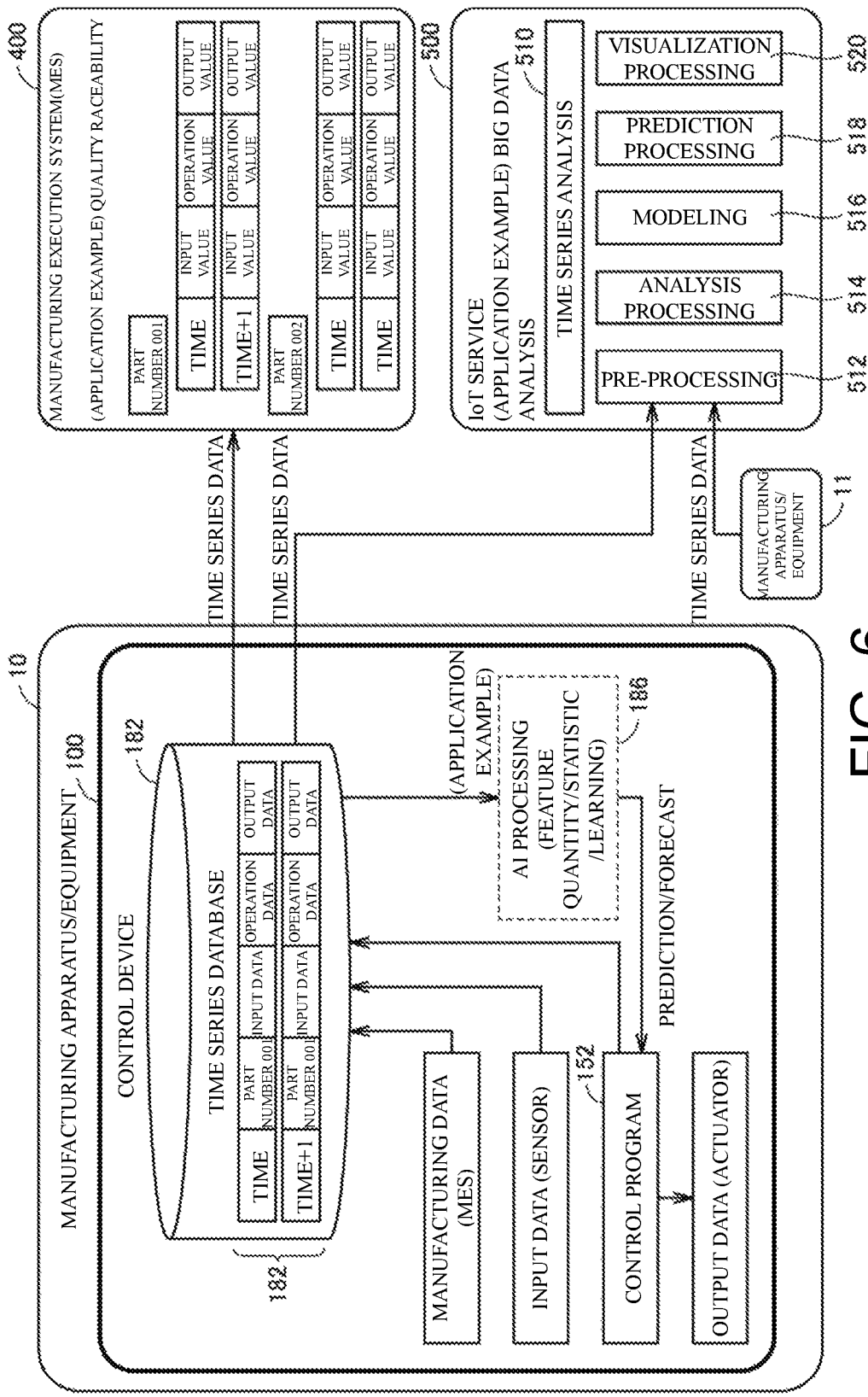
FIG. 6 is a diagram for describing an example of applications using time series data output from the control device according to the present embodiment.

Next, an example of applications using time series data output from the control device 100 according to the present embodiment will be described. FIG. 6 is a diagram for describing an example of applications using time series data output from the control device 100 according to the present embodiment.

In the example illustrated in FIG. 6, the manufacturing execution system 400 realizes quality traceability and the like using time series data from the control device 100. Specifically, it is determined whether time series data from the control device 100 is associated with any workpiece (product) on the basis of manufacturing data included in the time series data. It is possible to detect a state of each workpiece during manufacture by arranging determined time series data for respective workpieces in the order of generation time. For example, FIG. 6 illustrates an example in which a plurality of pieces of time series data are stored in association with a workpiece corresponding to "part number 001" and a plurality of pieces of time series data are stored in association with a workpiece corresponding to "part number 002."

As illustrated in FIG. 6, the control device 100 (the higher level connection program 192 of FIG. 4) outputs a data set (record 600) to the manufacturing execution system 400. In addition, the manufacturing execution system 400 specifies target products on the basis of manufacturing data (values stored in the manufacturing data field 604) included in the data set (record 600) and generates information related to quality traceability on the basis of observed values (at least part of values stored in the input data field 605, the operation data field 606 and the output data field 607) with respect to the specified products.

Quality traceability can be realized by performing classification and statistical processing of time series data as described above.

In addition, in the example illustrated in FIG. 6, the IoT service 500 realizes so-called big data analysis. Not only time series data from the control device 100 which controls manufacturing apparatus/equipment 10 but also time series data from other manufacturing apparatuses/equipment 11 are output to the IoT service 500. Various analyses are performed on time series data from one or more manufacturing apparatuses/equipment in the IoT service 500. Time series analysis 510 is illustrated as an example of such analyses.

In time series analysis 510, pre-processing 512 is performed on time series data. In the pre-processing 512, a process of extracting a feature quantity or the like from time series data and decreasing the dimensions, a process of excluding abnormal values and outliers, and the like are performed. Analysis processing 514 is performed on the time series data on which the pre-processing 512 has been performed. Modeling 516 is performed on the basis of the results of the analysis processing 514 to generate a model with respect to a manufacturing apparatus/equipment corresponding to a control target. Furthermore, processing 518 of predicting generation of abnormality, progress of deterioration and the like is performed on the basis of the generated model. Finally, the results of the prediction processing 518 may be visually output using a graph, a table or the like (visualization processing 520).

As illustrated in FIG. 6, the control device 100 (the gateway program 194 of FIG. 4) outputs the data set (record 600) to the IoT service 500. In addition, the IoT service 500 saves a larger amount of data sets from the control device 100 than the amount of data stored in the time series database 180 of the control device 100 and performs data analysis based on the saved data sets.

Typically, implementation of the IoT service 500 in an environment having sufficient operation resources on a cloud may be conceived. Accordingly, hidden characteristics and the like can be discovered using a large amount of time series data.

Furthermore, FIG. 6 illustrates an example in which artificial intelligence (AI) processing 186 is performed in the control device 100. In AI processing 186, for example, machine learning with a teacher is performed and abnormality or deterioration trends generated in a manufacturing apparatus/equipment corresponding to a control target may be detected in advance.

Specifically, the AI processing 186 generates a feature quantity from one or more observed values managed by the control device 100, performs statistical processing on the generated feature quantity and then saves the feature quantity as learning data. In addition, when some new observed values are input, the AI processing 186 calculates degrees indicating how much the input observed values have deviated from the learning data and determines the presence or absence of abnormality and deterioration trends on the basis of the calculated deviation degrees.

It is possible to substantially detect abnormality and deterioration trends generated in a manufacturing apparatus or equipment corresponding to a control target in real time by implementing such AI processing 186 inside of the control device 100.

Figure 7:
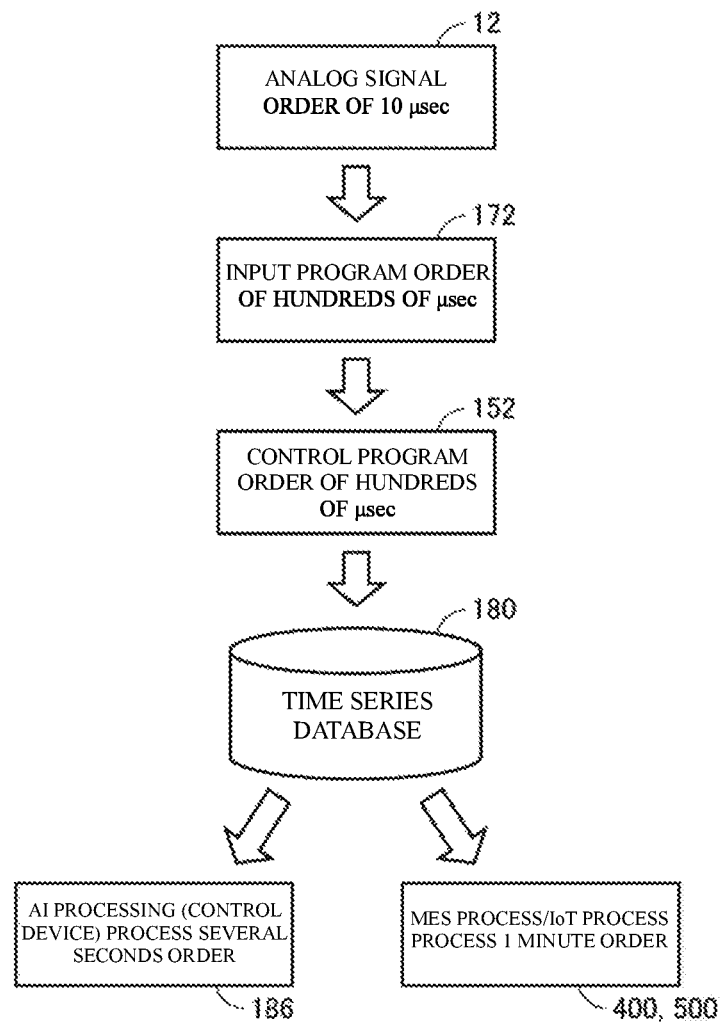
FIG. 7 is a diagram for describing temporal performance in an application using time series data output from the control device according to the present embodiment.

Here, temporal performance of time series data in each application shown in FIG. 6 will be described. FIG. 7 is a diagram for describing temporal performance in an application using time series data output from the control device 100 according to the present embodiment. Referring to FIG. 7, at the level of an I/O unit connected to the control device 100, for example, measurement signals (analog signals) output from a sensor are collected in the order of every 10 msec (specifically, converted into digital signals). Input data from the sensor acquired via the I/O unit is obtained as an interval variable of the control device 100 according to the input program 172 of the control device. For example, acquisition of the input data according to the input program 172 is performed in the order of hundreds of μsec.

The control program 152 repeatedly executed in the control device 100 executes a control operation with the same period as the period in which input data is acquired according to the input program 172. That is, the control program 152 executes a control operation in the order of hundreds of μsec. In addition, input data is stored in the time series database 180 with the period of execution of the control program 152. In this manner, corresponding data may be sequentially stored in the time series database 180 in the same period as the execution period of a control operation in the control program 152.

Although saving of time series data depends on the capacity of the time series database 180, when the time series database 180 having capacity of several GBytes is employed, for example, time series data corresponding to tens of minutes to several hours can be saved if input data and the like are stored in the order of hundreds of μsec.

The AI processing 186 executes a process such as abnormality detection by sequentially using time series data stored in the time series database 180. In the AI processing 186, one-time abnormality detection process is performed in the order of every several seconds. On the other hand, various processes executed in the manufacturing execution system 400 and the IoT service 500 require a longer time than the AI processing 186 and are executed in the order of 1 minute, for example.

As illustrated in FIG. 7, in the system based on the control device 100 according to the present embodiment, an observed value can be acquired in the order of 10 μsec and writing to the time series database 180 can be realized in a period in the order of hundreds of μsec. Since observed values can be rapidly acquired in this manner, it is possible to provide an environment in which data analysis from the various viewpoints can be consistently performed by differentiating periods, data quantities and the like corresponding to targets.

Meanwhile, since measurement signals (analog signals) output from a sensor can be acquired in the order of 10 seconds at the level of the I/O unit, as illustrated in FIG. 7, input data rapidly acquired in this manner may be combined and transmitted to the control device 100. For example, when a collection period of the I/O unit is 10 μsec and a communication period of the field bus is 100 μsec, collected data corresponding to ten instances of communication may be transmitted through one-time communication. By employing such a collected data transmission method, input data can be acquired with a resolution exceeding the communication period of the field bus and greater micro-analysis can be performed.

G. Modified Example

Although the control device 100, the support device 200 and the display device 300 are configured as separate bodies in the control system 1 of FIG. 1, a configuration in which all or some of these functions are integrated into a single device may be employed.

H. Advantages

When various types of data exchanged with a field device group are provided to a cloud service such as an IoT service as described above in a conventional configuration, it is necessary to provide a device for transmitting data (e.g., a box type IoT gateway or the like), connect one or more sensors to the IoT gateway device and transmit necessary data using a communication line included in the IoT gateway device.

Such a box type device is required for each of the one or more sensors and a plurality of devices and programs for executing necessary processes in the respective devices are required. In addition, the IoT gateway device merely observes a control target and the like from the outside and control operations for the control target are required separately from such observation, and thus various types of information used in the control operations, measurement values from each sensor and execution command values applied to the control targets need to be associated with one another on the cloud.

On the contrary, the control device according to the present embodiment can be connected to various types of field devices (sensors, actuators and the like) via a local bus, a field bus, a field network and the like, perform control operations using information (input data and output data) exchanged with such field devices and output necessary commands.

Furthermore, the control device according to the present embodiment can store operation data, output data and manufacturing data in a time series and has a gateway function of outputting at least some of the stored time series data to the outside such as the IoT service. That is, the control device according to the present embodiment executes control operations for control targets including a field device groups and also serves as an IoT gateway which transmits data saved therein to a server or the like on a cloud.

By implementing the gateway function in addition to the control operation function in the control device in this manner, the overall system configuration can be simplified, devices of various types (input/output apparatuses) can be simultaneously used, and high functionality of analysis and interpretation can be realized by associating control operations and manufacture information with each other at the same time in addition to input and output information.

When the control device according to the present embodiment is employed, it is not necessary to introduce an additional apparatus for communication even when the IoT service and the like are used. Further, since operation data, output data and manufacturing data can be processed in parallel in addition to input data at each time, more accurate analysis can be performed in both the manufacturing execution system and the IoT service.

Furthermore, at the user side, information of a field apparatus side (input data, operation data and output data) and manufacture information at the manufacturing execution system side can be associated with each other to realize various processes (e.g., a storage process, a statistical process, a learning process, a visualization process and the like).

The disclosed embodiments are to be construed in all aspects as illustrative and not restrictive. In view of the foregoing, the disclosure is intended to cover modifications and variations provided that they fall within the scope of the following claims and their equivalents.

What is claimed is:

1. A control device, comprising:
a control operation unit, configured to acquire input data from a control target connected to the control device over a bus or a network in an order of hundreds of μsec and determines output data for the control target by executing a control operation based on the acquired input data, wherein the control target collects the input data in an order of 10 μsec;
a manufacturing data acquisition unit, configured to acquire manufacturing data from a manufacturing execution system associated with the control target over a higher level network, wherein the manufacturing data comprise at least one of a part number, a lot number and a recipe number of a product;
a time series database, configured to sequentially store at least some of the input data, the output data, operation data calculated in the control operation according to the control operation unit, and the manufacturing data in a time series, wherein data are sequentially stored to the time series database in the same period as an execution period of the control operation in the control operation unit; and
an outside output unit, configured to output a data set including at least some of the input data, the output data, the operation data and the manufacturing data.

2. The control device according to claim 1, wherein the outside output unit outputs the data set to the manufacturing execution system, and
the manufacturing execution system specifies a target product on the basis of the manufacturing data included in the data set and generates information related to quality traceability on the basis of the observed values with respect to the specified target product.

3. The control device according to claim 1, wherein the outside output unit outputs the data set to an external server, and
the external server saves a larger amount of data sets from the outside output unit than the amount of data stored in the time series database of the control device and performs data analysis based on the saved data sets.

4. The control device according to claim 2, wherein the outside output unit outputs the data set to an external server, and the external server saves a larger amount of data sets from the outside output unit than the amount of data stored in the time series database of the control device and performs data analysis based on the saved data sets.

5. The control device according to claim 1, wherein the observed values are associated with information indicating a time or timing at which the observed values are acquired in the data set.

6. The control device according to claim 2, wherein the observed values are associated with information indicating a time or timing at which the observed values are acquired in the data set.

7. The control device according to claim 3, wherein the observed values are associated with information indicating a time or timing at which the observed values are acquired in the data set.

\* \* \* \* \*